Patented Jan. 7, 1930

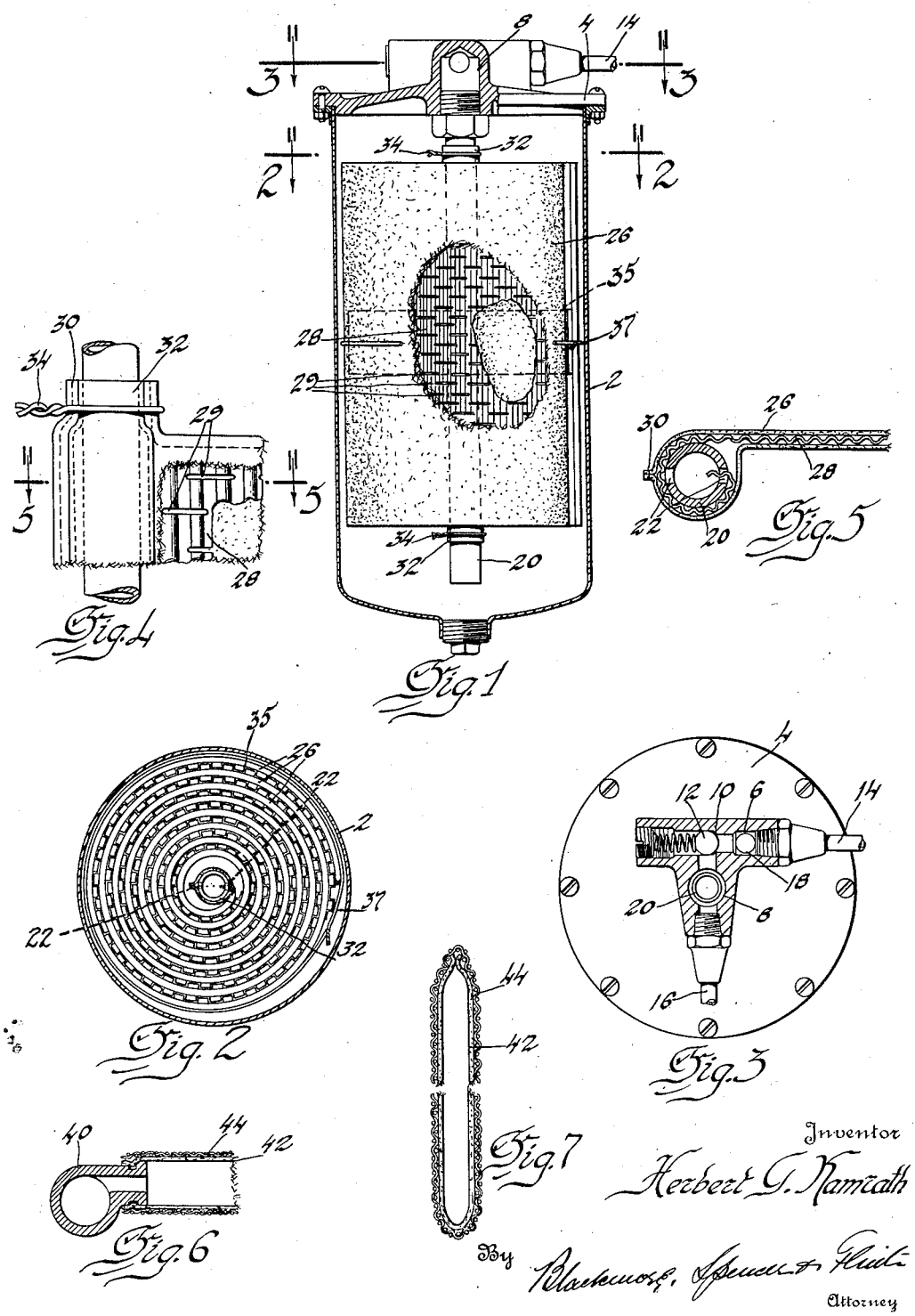

1,742,768

UNITED STATES PATENT OFFICE

HERBERT G. KAMRATH, OF FLINT, MICHIGAN, ASSIGNOR TO A C SPARK PLUG COMPANY, OF FLINT, MICHIGAN, A COMPANY OF MICHIGAN

FILTER

Application filed August 13, 1925. Serial No. 49,996.

The object of this invention is the production of a filter of simple design which will serve in an efficient manner for the removal of impurities from the fluid passing through it. The filter here disclosed has been designed primarily for use in connection with the lubricating systems of automobiles for the cleaning of the lubricating oil but its usefulness is not restricted to this field.

The filter consists essentially of a sheet of fabric arranged in the path of flow of the oil and presenting a considerable area for the passage of the stream therethrough, the fabric having associated with it a device for separating the layers thereof so that the oil need pass through but a single ply of material in going through the filter. The separator is preferably perforated to permit the free passage of the oil along the surface of the fabric. In my preferred form I have arranged the fabric in the form of a bag having its open end associated with one of the ports of the filter chamber and have placed the separator within the bag. In order to lodge the filtering medium within a comparatively small compass I have arranged it in a plurality of superposed layers, preferably in the form of a coil so that it may be compactly assembled in the filter chamber.

I have also provided my filter with a pressure controlled bypass for the passage of oil should the filter become clogged. This bypass, together with the inlet and outlet, I have preferably arranged in the cover of the filter so that all of the ports and passages leading to and from the filter may be provided in one member which may be easily made by casting.

Referring now to the drawings:

Figure 1 is a vertical section of my improved filter, the filtering medium being shown in elevation with parts broken away to better show the construction;

Figure 2 is a section on line 2—2 of Figure 1;

Figure 3 is a section on line 3—3 of Figure 1;

Figure 4 is a fragmentary view showing the manner of mounting the filtering medium;

Figure 5 is a section on line 5—5 of Figure 4;

Figure 6 is a horizontal sectional view through a portion of a modified form of filter; and Figure 7 is a vertical section through one of the turns of the filtering medium shown in Figure 6.

The reference character 2 indicates a substantially cylindrical casing having a cover 4. This cover is preferably in the form of a casting shaped to provide an inlet port or passageway 6 and an outlet port or passageway 8. These passageways are preferably arranged at an angle to each other and the walls of the passageway 6 at its junction with the passageway 8 are formed to provide a seat 10 for a spring pressed valve 12. The functioning of these parts will be later described.

A pipe 14, suitably connected in the lubricating system, leads to the inlet port 6 while pipe 16 communicates with the outlet port 8. The inlet port 6 has direct communication with the interior of the casing 2 through an opening 18, while the port 8 communicates with the interior of the casing through a pipe 20 having a closed lower end and provided with longitudinal slots 22 through which oil passing through the filter may enter for discharge through the outlet port.

The filtering medium consists of a bag-like member 26 made of fabric such as Canton flannel, within which is located the separator 28. The fabric may be single ply or double ply as desired. The separator consists of a corrugated sheet of stiff material such as copper provided with a number of fine slits or perforations indicated at 29. The open end of the bag-like member 26 is in communication with the slots 22 in the pipe 20 and is secured to the pipe in the manner shown in Figures 1, 4, and 5. That is, the end of the separator 28 is bent at an angle and secured within one of the slots 22 and the ends of the fabric forming the bag are wrapped around the pipe and the end of the separator which now encircles the pipe and are sewed together as at 30. The corners of the pieces of the fabric forming the sack are also preferably extended so as to form flaps as at 32 and sewed together so as to closely embrace the pipe 20 and to further insure against leakage a clamping means such as the wire 34 is used to bind the corners to the pipe.

It will be noted from Figure 2 that the bag-like member 26 is of considerable length and is arranged in a plurality of superposed layers around the pipe 20. The separator 28 may be substantially coextensive in area with the bag although this is not essential.

If desired, a spacer 35 made of sheet metal and having vertical corrugations as shown in detail in Figure 2 and indicated by dotted lines in Figure 1, may be interposed between the turns of the filter to keep them from sticking together. While this spacer is shown as a narrow band of corrugated material applied at the center of the filter only, it is obvious that it may be varied in form, dimensions, and location, as desired.

In assembling the structure the filtering medium, with the separator 28 disposed within it, and the spacer 35 are tightly coiled about the pipe 20 whereupon the coil may be tied in a compact unit by any suitable means such as the wire 37. If desired, the wire may be omitted the resilience of the separators being relied upon to hold the coils of the filtering medium apart. The assembled coil is then inserted in the casing 2 whereupon the cover 4 is secured in position and the filter is ready for use. The oil entering through the pipe 14, inlet port 6, and opening 18, surrounds the filtering medium and, being under pressure, passes through the fabric 26 into the interior of the bag and thence finds its way along the length thereof between the plies of cloth and through the apertures in the separator and the openings 22 into the pipe 20 and thence through the outlet port 8 and pipe 16 back into the circulating system.

With the arrangement as described a very large area of filtering medium is presented to the fluid and this advantage is obtained without the loss of compactness. The provision of a large filtering surface minimizes the possibility of clogging but should clogging occur, a sufficient pressure will be built up in the inlet passage 16 to force the valve 10 from its seat and allow oil to pass directly from the inlet to the outlet. It will also be noted that the valve 12 is so arranged with respect to the passageway that when the valve is off its seat the inlet port and outlet port are in direct communication avoiding the necessity of providing an enlargement of the passageway around the ball for the passage of the fluid.

In Figures 6 and 7 I have shown, somewhat diagrammatically, a slightly modified arrangement. In this form the oil enters the casing through the pipe 40 and is discharged into the bag-like member 42 which is enclosed within the separator 44 which may also be in the form of a bag. In this case the pressure of the fluid is relied upon to separate the plies of the fabric.

It will be noted in this form that I have also shown the separator as made of fine wire mesh as an alternative for the perforated corrugated metal of the preferred form.

Any preferred means may be used for causing the circulation of oil through the filter. Thus the filter may be connected in the line of a pressure lubricating system; it may be used with low pressure or splash systems, an auxiliary pump being provided to produce the flow of lubricant; or it may be used in connection with any one of the well known oil rectifying systems some of which utilize engine suction to move the oil.

I claim:

1. In a filter, the combination of a tubular member having a plurality of longitudinally extending ports therein, a filter of bag-like form having flaps adjacent its ends, said flaps being secured around said tubular member to establish communication between the port and the interior of the bag, a spacer within the bag, said spacer having one end anchored in one of said ports.

2. In a filter, a central hollow member permitting the passage of liquid, a filtering medium having its ends jointed around but not secured to said member, a separator between double layers of said filtering medium, said separator and filtering medium wound in spiral form, and means in said member to allow for the flow of oil between said bag and member, said separator having its ends secured in said means.

In testimony whereof I affix my signature.

H. G. KAMRATH.